United States Patent [19]

Imazeki et al.

[11] 4,396,974
[45] Aug. 2, 1983

[54] METHOD OF PREPARING AND EXECUTING SEQUENCE PROGRAM FOR SEQUENCE CONTROLLER USED IN MACHINE TOOL CONTROL

[75] Inventors: Ryoji Imazeki, Hachioji; Katsuaki Kusumi, Kawasaki; Yoshihiro Nakajima, Hino, all of Japan

[73] Assignee: Fujitsu Fanuc Limited, Tokyo, Japan

[21] Appl. No.: 185,808

[22] Filed: Sep. 10, 1980

[30] Foreign Application Priority Data

Sep. 18, 1979 [JP] Japan .................... 54-119627

[51] Int. Cl.³ .................................. G06F 15/46
[52] U.S. Cl. .................................. 364/138; 364/474; 364/136
[58] Field of Search ............ 364/200, 300, 119, 551, 364/474, 138, 136; 371/25, 68

[56] References Cited

U.S. PATENT DOCUMENTS

| 3,987,282 | 10/1976 | Lau et al. | 364/138 X |
| 4,029,950 | 6/1977 | Haga | 364/138 X |
| 4,052,601 | 10/1977 | Corni | 364/138 |
| 4,096,563 | 6/1978 | Slawson | 364/138 X |
| 4,118,772 | 10/1978 | Takada | 364/138 X |
| 4,152,765 | 5/1979 | Weber | 364/474 |
| 4,281,379 | 7/1981 | Austin | 364/474 X |

Primary Examiner—Edward J. Wise
Attorney, Agent, or Firm—Staas & Halsey

[57] ABSTRACT

A method of preparing and executing a sequence program for effecting the sequence control of a sequence controller for a machine tool by executing a subroutine program. A sequence diagram is prepared, which diagram expresses a function command for a subroutine as data divided into control conditions and parameters. From the sequence diagram a sequence program is prepared, which program includes a command for reading data indicative of a control condition, and parameter data of which a subroutine is informed. The sequence program so prepared is then executed.

2 Claims, 12 Drawing Figures

Indexing Position    Indexing Position

Fig. 3

| Code | Bit Value and Meaning |
|---|---|
| RNO | 0 ; Positions of rotary body (magazine etc) numbered consecutively starting home No. 0<br>1 ; Positions of rotary body (magazine etc) numbered consecutively starting from No. 1 |
| DIR | 0 ; Rotation is unidirectional (CW) only<br>1 ; Rotation is bidirectional (CW, CCW) |
| POS | 0 ; Number of steps to target position computed<br>1 ; Number of steps to position one step before target position computed |
| ACT | 0 ; No process executed. R I unaffected<br>1 ; Process executed. |

Fig. 4

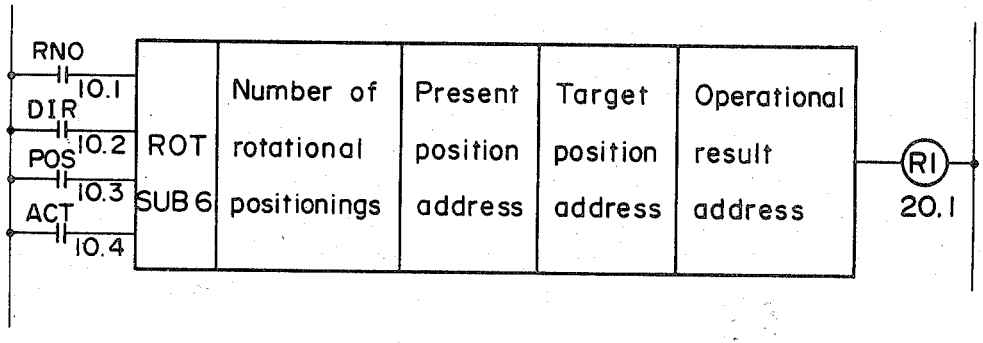

Fig. 5
| Command | Bit position and parameter |
|---|---|
| RD | 10.1 |
| RD.STK | 10.2 |
| RD.STK | 10.3 |
| RD.STK | 10.4 |
| SUB | .6 |
| | ○○○○ ○○○○ ○○○○ ○○○○ } Parameter |
| WRT | 20.1 |
Fig. 6
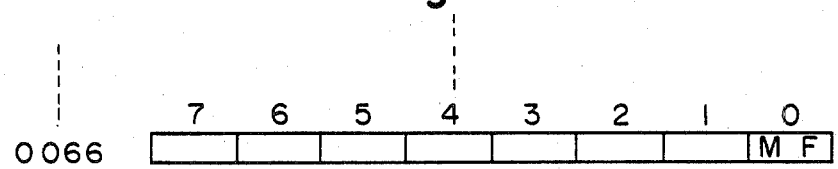
Fig. 7
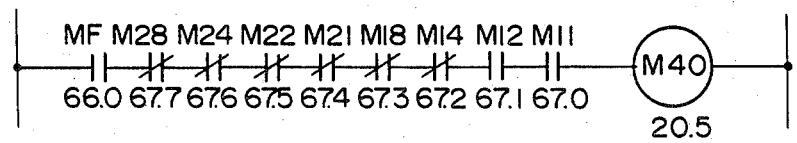

Fig. 8
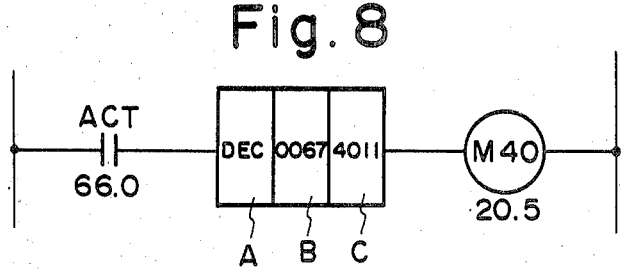
Fig. 9
| Command | Address and Parameter |
|---|---|
| R D | 66.0 |
| DEC | 67 |
| | 4011 |
| WRT | 20.5 |
Fig. 10 (A)
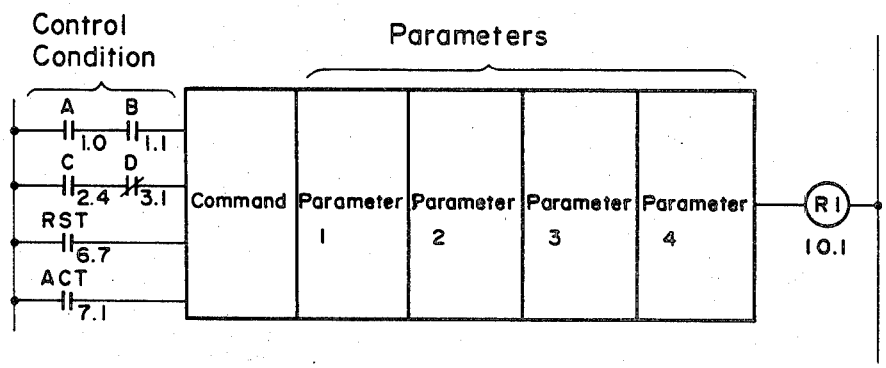
Fig. 10 (B)
| Command | Address and Parameter | |
|---|---|---|
| RD | 1.0 | |
| AND | 1.1 | |
| RD.STK | 2.4 | |
| AND.NOT | 3.1 | |
| RD.STK | 5.7 | |
| SUB | 7.1 | |
| | ○○ | Subroutine No. |
| | ○○○○ | Parameter 1 |
| | ○○○○ | Parameter 2 |
| | ○○○○ | Parameter 3 |
| | ○○○○ | Parameter 4 |
| WRT | 10.1 | |

METHOD OF PREPARING AND EXECUTING SEQUENCE PROGRAM FOR SEQUENCE CONTROLLER USED IN MACHINE TOOL CONTROL

BACKGROUND OF THE INVENTION

This invention relates to a method of preparing and executing a sequence program for a programmable sequence controller for such applications as machine tool control.

Sequence control executed by a sequence controller ranks along with feedback control as one of the two principal forms of automatic control, and it has recently found use in controlling a variety of industrial machines. In executing sequence control, a sequence program utilizing a prepared subroutine is written in accordance with the operating sequence of the machine which is to be controlled, and the program is loaded into the memory of a programmable sequence controller.

In sequence programming, the sequence can be expressed in terms of relay symbols, logical symbols or by Boolean algebra. The relay symbol method of representing the sequence is advantageous if consideration is given to the historical background of the old sequence controllers constructed by combining contact relays. However, the relay symbol system necessitates an extremely complicated process when applied to a machine tool of the type having an automatic tool changing mechanism. In a machine tool of this type a magazine is revolved to permit a desired tool to be extracted from a tool holder and then attached to a spindle head, or to permit a tool which is already mounted in a spindle to be extracted from the spindle and carried back to the original position where the tool is again accommodated in the tool holder. A complicated process of this type generally cannot be expressed in the form of a ladder diagram and must be programmed separately by means of assembly language or the like. Hence there is need for a method which can facilitate the writing of a sequence program for executing a complicated process.

BRIEF SUMMARY OF THE INVENTION

The present invention discloses a method of preparing and executing a sequence program for a sequence controller used to control a machine tool, through which a simplification is achieved in the writing of a sequence program for executing, by means of a subroutine, a complicated machine tool sequence.

Accordingly, an object of the present invention is to provide a method of preparing and a method of executing a sequence program for a sequence controller used to control a machine tool, through which the writing of the sequence program can be facilitated.

It is another object of the present invention to provide a method of preparing and a method of executing a sequence program for a sequence controller used to control a machine tool, through which a simplification is achieved in the writing a program for a complicated sequence.

It is still another object of the present invention to provide a method of preparing and a method of executing a sequence program for a sequence controller used to control a machine tool, through which even an individual who is not proficient in the preparation of sequences can readily write a sequence program.

It is a further object of the present invention to provide a method of preparing and a method of executing a sequence program for a sequence controller used to control a machine tool, through which a sequence program can be written easily using a sequence diagram in which a function command is expressed by being divided into a control condition command and parameters.

Other features and advantages of the invention will be apparent from the following description taken in connection with the accompanying drawings.

BRIEF DESCRIPTION OF THE DRAWINGS

FIG. 3 is a chart, showing rotation control conditions, used in preparing a sequence program according to the present invention;

FIG. 4 illustrates an embodiment of a ladder diagram according to the present invention;

FIG. 5 is a chart showing a sequence program prepared by using the ladder diagram of FIG. 4;

FIG. 6 is a diagram showing an array of input data stored in a memory and employed in another embodiment of the present invention;

FIG. 7 is a ladder diagram illustrating an M function;

FIG. 8 is a ladder diagram of another embodiment of the present invention;

FIG. 9 is a chart showing a program prepared using the ladder diagram of FIG. 8; and FIGS. 10A and 10B show a ladder diagram and a program, respectively, representing the present invention in general form.

DESCRIPTION OF THE PREFERRED EMBODIMENTS

Figure 1:
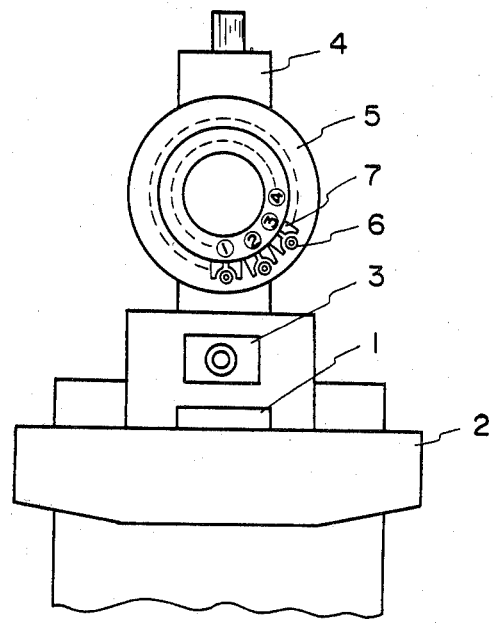
FIG. 1 is a front view of a machining center which is controlled by a sequence program prepared according to the present invention.

Referring now to FIG. 1 which is the front view of a machining center having a horizontal spindle, a table 1 for supporting a workpiece is adapted to the moved in X-, Y- and Z-directions on a base 2. A spindle head 3 is provided for mounting a tool, as well as a magazine 5, which is movable vertically along a main column 4, for rotatively carrying a plurality of tools 6. The magazine has a holding member 7 for holding the arbor of a corresponding tool 6. To change tools the magazine 5 is revolved to bring a prescribed one of the tools 6 into position directly above the spindle head 3, after which the magazine 5 is lowered to bring the corresponding arbor into position in front of the spindle head. The spindle head 3, whose rotary shaft has a chuck provided at the end thereof, is then projected forwardly so that the arbor of the selected tool is received and then grasped by the chuck. Next, when the magazine is raised, the tool separates from the corresponding holding member 7 and is left mounted on the spindle head 3.

Figures 2A, 2B:
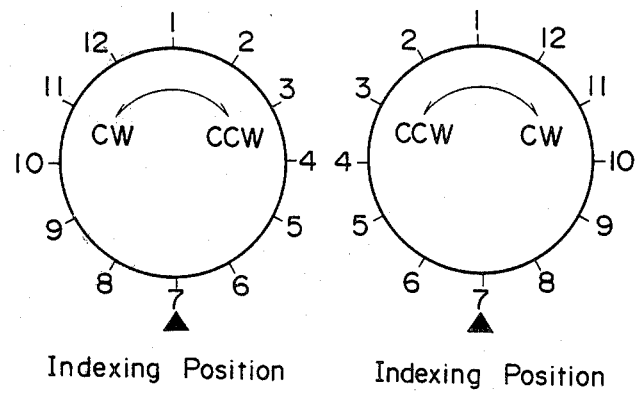
FIGS. 2A and 2B are illustrative views which are useful in describing the position and direction of rotation of a magazine provided on the machining center of FIG. 1.

The magazine 5 of the machining center depicted in FIG. 1 is divided into 12 quadrants as illustrated in FIGS. 2A and 2B, each quadrant being equipped with a single tool. The magazine 5 is capable of being rotated in the clockwise (CW) direction only, or in both the clockwise and counter-clockwise (CCW) directions. In connection with the direction of rotation, rotation in a direction which increases the position numbers will be defined as the CW direction, and rotation in a direction which decreases the position numbers will be defined as the CCW direction.

The sequence for control of magazine rotation can be expressed in the form of a ladder diagram. To this end the function command for the control of rotation is expressed by dividing it into control condition data, and data consisting of parameters for a subroutine.

The conditions which need to be set for controlling the rotation of the magazine 5 are four in number. They are: (1) whether the number representing the position of the magazine starts from 0 or 1; (2) whether the direction of magazine rotation is the CW direction only or both the CW and CCW directions; (3) whether the number of steps from the present position of the magazine to a target position is to be computed, or from the present position to that position one step before the target position because of a braking operation; and (4) whether the rotation control sequence is to be executed or not. All of these conditions can be expressed by a relay code having a symbolic code attached thereto. These conditions for controlling the rotation of the magazine are expressed in FIG. 3.

The parameters for the subroutine are the number of steps by which the magazine 5 is to be rotationally indexed, the address of the present position of the magazine (which is at position No. 7 in the example of FIG. 2), the address of the target position, and the address which identifies the result of a computation. These values are expressed in the form of a two-digit BCD.

Reference will now be had to FIG. 4 which is a ladder diagram expressing the sequence of the rotation control function described above, and which is used to prepare a sequence program for rotation control. In FIG. 4 the relay code is the portion which sets the control conditions, and each control condition is expressed by a symbolic code. Shown in FIG. 4 are the addresses identifying the locations of the memory where the data, representing the control conditions, is stored. According to the notation employed to express these addresses, the first bit at the 10th address of the memory shall be expressed by "10.1", and so on. Furthermore, data to be processed by the subroutine is expressed directly in the form of a BCD. A symbol R1 with 20.1 is employed to write the result of the execution by the subroutine in the first bit of 20th address.

A ladder diagram of the foregoing type is used to prepare a sequence program, of the type shown in FIG. 5, for a rotation control command. This program is written in the memory which is used to store the sequence program.

To execute sequence control of the magazine rotation using a program as described above, the following takes place. First, in accordance with a READ command RD or READ STACK command RD·STK, the abovementioned four items of control condition data are read out from the prescribed locations of the memory storing the logical value of the relay codes, RNO, DIR, POS, ACT etc., and the data is stored in a register. Furthermore, a SUB command initiates a shift to execution of the subroutine program. In accordance with execution of the subroutine program, control conditions stored in the register are read out, and a rotation command is executed on the basis of the control conditions and the input parameters. Finally, in compliance with a write command WRT, the direction of rotation obtained by executing the subroutine program is written in the first bit at the 20th address of the memory. The direction of rotation is CW if the result is "0", and CCW when the result is "1".

When a machine tool is controlled through use of a numerical control device, the latter frequently issues M (miscellaneous) function commands that indicate, for example, the direction in which a spindle is to rotate. This M function command signal is composed of an M code signal of one digit indicative of an M function command, and an BCD code of eight digits. In another embodiment of the present invention, the M function command signal delivered by the numerical control device is temporarily stored in the memory of the sequence controller. The M code signal of the M function command signal is stored in, say, the 0th bit at the 66th address, as shown in FIG. 6, and the BCD code of 8 digits is stored in order from the 0th bit to the 7th bit at the 67th address.

Meanwhile, a sequence for decoding the M function command from the numerical control device on the sequence controller side can be expressed using a ladder circuit that employs 9 relay contacts, as illustrated in FIG. 7. Ten steps are required in the logical operation for decoding the function command, and the process is fairly complex. However, a great reduction in the number of steps can be achieved if the decoding operation on the side of the sequence controller is processed by a method relying upon the abovesaid subroutine. To this end, a ladder diagram shown in FIG. 8 uses a relay code to express a sequence for a case where the M function command is to be decoded at the sequence controller. In FIG. 8, a relay contact ACT is the portion for setting the control condition, and it designates the address (specifically the 0th bit of the 66th address), of the memory, at which the M code signal is stored. If the M code signal is a "1", the decoding operation takes place; if a "0", no decoding takes place, i.e., relay M 40 is in the OFF position. The portion which represents the data sent to the subroutine comprises a portion A representing the symbolic code DEC of a decode command, an address assigning portion B for assigning the address (the 67th address) of the memory at which the BCD code of the M function command is stored, and a decode designating portion C. Written in the address assigning portion B in the form of a two-digit BCD is the address of the location which stores the BCD code of the M function signal sent by the numerical control device, and written in the decode designating portion C is a decode number as well as a value which is indicative of the number of digits to be decoded. The decode number will be 40, for example, if M40 is to be decoded. If the value indicative of the number of digits to be decoded is 01, this means that decoding is conducted with the higher order digit of the two-digit BCD of the M function signal (a two-digit number in decimal notation) set to zero; if 10, decoding is conducted with the lower order digit; if 11, both digits are decoded.

A sequence program for a decode command, as shown in FIG. 9, is prepared on the basis of the ladder diagram of FIG. 8. The program is written in the memory which stores the sequence program.

When executing the decode command sequence control using a program of the above type, data is read out from the prescribed location (66.0) of the memory at which the M code signal is stored, this taking place in compliance with the RD command, and processing is then shifted to the subroutine operation under the DEC command. Then, in accordance with the subroutine, a command is executed on the basis of the read out M code signal, the eight-digit BCD code which has been written at the address (the 67th address) denoted in the address assigning portion B, and the decode designation denoted in the decode designating portion C. Finally, in compliance with the WRT command, the value obtained by the execution of the subroutine is written in the 5th bit at the 20th address of the memory. If the M function signal "M40" is instructed by the numerical controller, the logical value "1" is set in the 5th bit of the 20th address of the memory. Then the content of the said bit is read out and sent to the machine tool side resulting in the action of the machine tool corresponding to the "M40".

The preparation of a function command sequence has been described above in the case of two embodiments of the present invention. In summary, according to the invention, data of which the subroutine is informed in order to execute a subroutine process is expressed by being divided into control conditions and parameters, as shown by the general ladder drawing and program of FIGS. 10A and 10B, respectively. Thus, in addition to the above-said function command, a timer process command expressed by TMR, a counter command denoted by CTR, a code conversion command denoted by COD, a data transfer command, following a logical multiplication, denoted by MOVE, a common line control command denoted by COM, a jump command denoted by JMP, a parity check command denoted by PARI, a non-volatile memory write command denoted by MWRT, a binary to BCD or BCD to binary data conversion command denoted by DCNV, a magnitude comparison command denoted by COMP, a coincidence decision command denoted by COIM, and the like are expressed by the ladder diagram and programmed. In executing these function commands, the subroutine is informed of the control conditions after they are stored in a register through the use of the RD and RD·STK commands and the like, and the subroutine is informed of the parameters by defining them in the sequence program. Since each of the control conditions of which the subroutine is notified is the result (1,0) of a logical operation, it may be expressed as the result of a logical operation using AND, OR combinations.

In accordance with the present invention as described above, a sequence controller for a machine tool has its sequence prepared by dividing a function command into control conditions and parameter which are expressed by a sequence diagram. In the execution of the function command the processing is carried out by the subroutine of each command. Therefore, in connection with sequence preparation, the present invention makes it possible to express, by means of a sequence diagram, function commands of the type which could not be expressed by a sequence diagram with the conventional methods. It is also possible to express simply even fairly complex sequence diagrams. As a result, even individuals who are not highly skilled in sequence preparation can easily prepare a sequence for a machine tool.

Although the invention has been described in its preferred form with a certain degree of particularly, it is obvious that many modifications and variations are possible in the light of the above teachings. It is therefore to be understood that within the scope of the appended claims, the invention may be practiced otherwise than as specified described.

What we claim is:

1. A method of sequencing operations performed by a numerically controlled machine tool, said method comprising the steps of:

storing in a sequence controller memory a command signal received from a numerical control device, said command signal having first and second portions;

reading the first portion of the command signal out of the sequence controller memory;

starting a subroutine program in the sequence controller to decode the command on the basis of the memory address of the second portion of the command signal and a decode designation;

storing in the sequence controller memory the result obtained by the execution of said subroutine program;

reading the result out of the sequence controller memory for transmittal to the machine tool; and conducting a machine tool operation on the basis of the transmitted signal.

2. A method of using a sequence controller to sequence operations performed by a numerically controlled machine tool, characterized in that the method comprises the steps of:

storing, in a sequence controller memory, a sequence program which includes at least one function command expressed by at least one control condition and parameters;

storing, in the sequence controller memory, control condition information received from a numerical controller;

reading the control condition information from the sequence controller memory;

calling from the sequence controller memory a subroutine for executing the at least one function command after the control condition information has been read out, the subroutine being informed of the parameters by defining them in the sequence program;

writing in said sequence controller memory the result obtained by the execution of said subroutine program;

reading the result of said subroutine program from said sequence controller memory and transmitting it to the numerically controlled machine; and conducting a machine tool operation on the basis of the transmitted signal.

* * * * *